Dec. 14, 1965 J. E. MILLER 3,223,023

MACHINE FOR DISPENSING LIQUIDS

Filed May 8, 1961 7 Sheets-Sheet 1

INVENTOR.
JAMES E. MILLER
BY Charles S. Penfold
ATTORNEY

Dec. 14, 1965   J. E. MILLER   3,223,023
MACHINE FOR DISPENSING LIQUIDS
Filed May 8, 1961   7 Sheets-Sheet 2

INVENTOR.
JAMES E. MILLER
BY
Charles S. Penfold
ATTORNEY

Dec. 14, 1965  J. E. MILLER  3,223,023

MACHINE FOR DISPENSING LIQUIDS

Filed May 8, 1961  7 Sheets-Sheet 3

INVENTOR.
JAMES E. MILLER
BY
Charles A. Penfold
ATTORNEY

Dec. 14, 1965  J. E. MILLER  3,223,023
MACHINE FOR DISPENSING LIQUIDS
Filed May 8, 1961  7 Sheets-Sheet 4

INVENTOR.
JAMES E. MILLER
BY
Charles S. Penfold
ATTORNEY

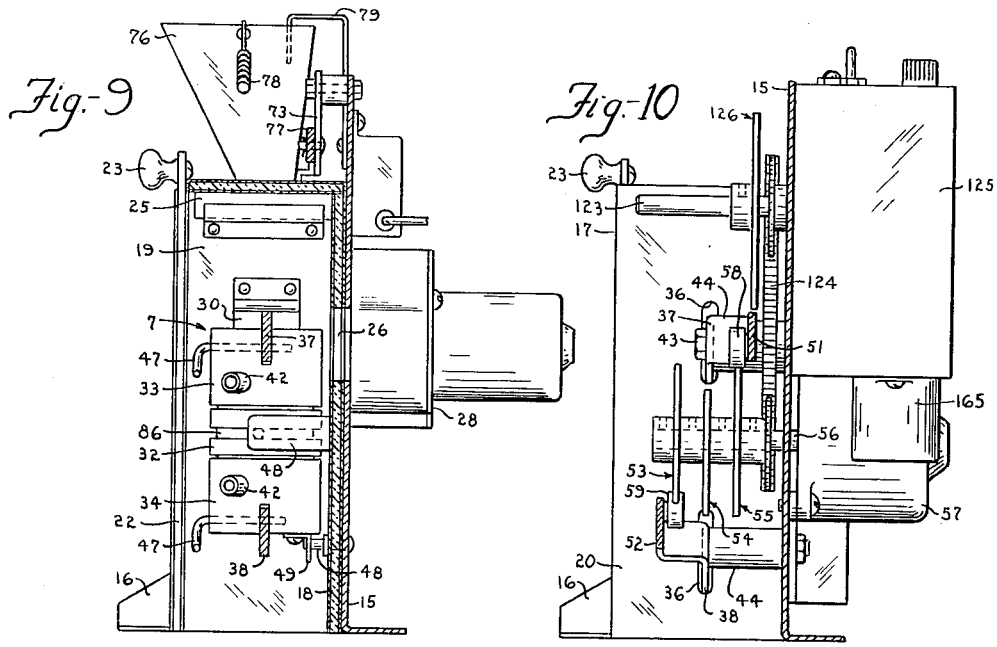
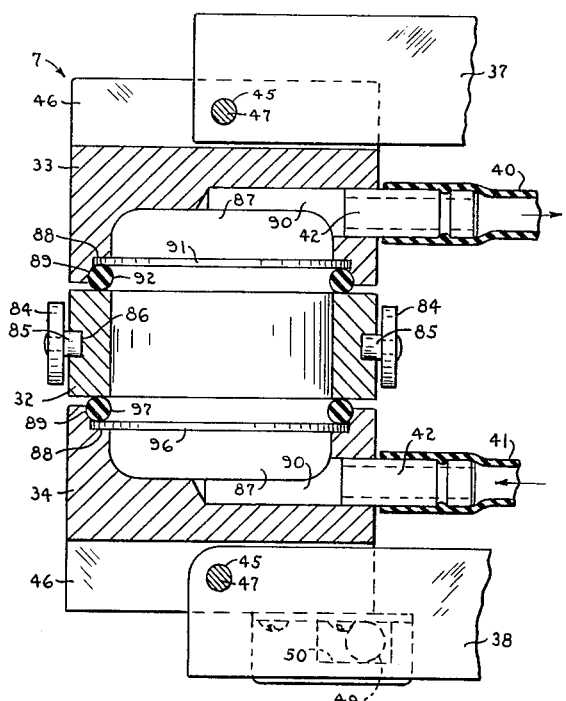
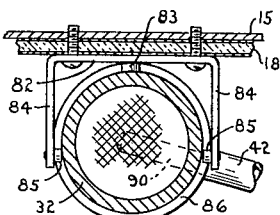
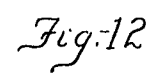
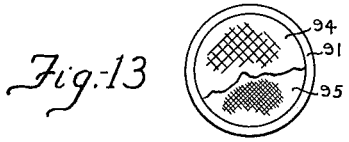
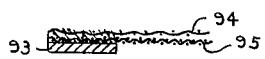

Dec. 14, 1965                        J. E. MILLER                        3,223,023
                              MACHINE FOR DISPENSING LIQUIDS
Filed May 8, 1961                                              7 Sheets-Sheet 6
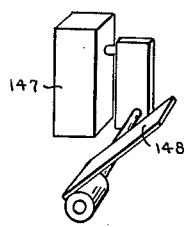
Fig.-16
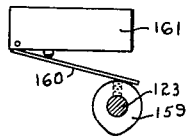
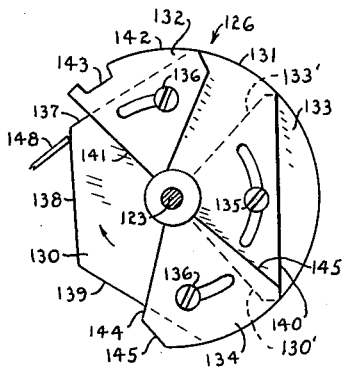
Fig.-17
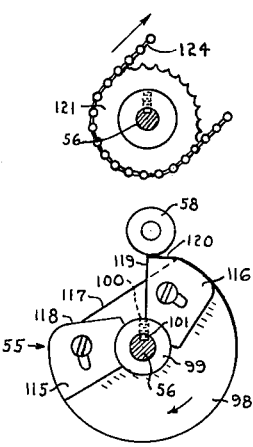
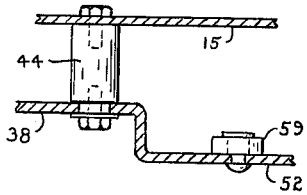
Fig.-18
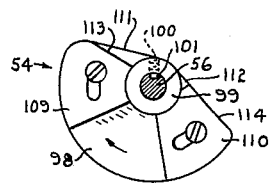
Fig.-15
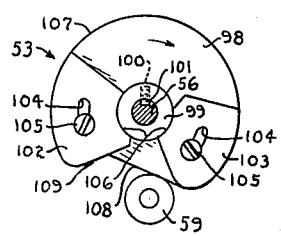
INVENTOR.
JAMES E. MILLER
BY Charles S. Penfold
ATTORNEY Dec. 14, 1965  J. E. MILLER  3,223,023
MACHINE FOR DISPENSING LIQUIDS
Filed May 8, 1961  7 Sheets-Sheet 7

INVENTOR.
JAMES E. MILLER
BY Charles S. Penfold
ATTORNEY

United States Patent Office 3,223,023
Patented Dec. 14, 1965

3,223,023
MACHINE FOR DISPENSING LIQUIDS
James E. Miller, 225 Ellsworth St., Gary, Ind.
Filed May 8, 1961, Ser. No. 108,415
13 Claims. (Cl. 99—283)

The subject invention relates generally to a dispensing apparatus and more particularly is directed to a coin operated machine for dispensing hot drinks, such as coffee.

One of the principal objects of the invention is to provide a machine embodying an improved percolator for brewing a commodity, such as coffee, including means whereby cream and/or sugar may be selectively added to the coffee after it has been brewed.

A significant object of the invention is to provide a brewer structure or percolator assembly which, among other things, includes a stationary open ended tubular element, a lower hollow head and an upper hollow head which are supported for movement in a manner whereby the lower head can be brought into engagement with the element to form a receptacle for receiving the coffee and the upper head can be moved into closing engagement with the element to define in combination with the element and lower head a sealed chamber so that hot water can be introduced thereto to initiate percolation of the coffee. Provision is also made whereby the chamber is automatically cleansed by a flushing operation of hot water after the coffee has been dispensed and the heads are separated from the element to release the coffee grounds for discharge from the assembly.

An important object of the invention is to provide a unique organization whereby the operation of the brewer heads is cam controlled and associated operating components of the machine are synchronized or connected in timed relation to the movement or positions of the heads. More particularly, a first cam means is provided for controlling the movement and positions of the lower head relative to the tubular element and the period of rinsing or flushing of such head. A second cam means serves to control the movement and positions of the upper head relative to the element, while a third cam means controls the brewing or percolating period. A fourth cam means is also provided for controlling the flow and retention of hot water in the percolator in timed relation to the introduction of ground coffee to the percolator when the heads are in sealed relation to the element.

A particular object is to provide means operatively connected to the third cam means, above referred to, for effecting a prompt or expeditious release of coffee grounds or any residual matter left after the brewing process.

A specific object of the invention is to provide a pair of pivotal levers for respectively supporting the heads, means operatively connected with the levers for locking the heads in relation to the element, and means operatively connected with at least one of the levers for automatically controlling the introduction of coffee to the brewer assembly.

Another objective of the invention is to provide a casing within which the brewer heads of the percolator are disposed to promote heating, sanitation, including means for exhausting brewing vapors or odors from the chamber.

A specific object of the invention is to provide a novel means for measuring and dispensing the coffee to the percolator through an opening provided in a wall of the casing.

Another specific object of the invention is to provide a machine whereby the strength of the coffee may be readily regulated.

Another specific object is to provide a setup whereby a chute for discharging the ground coffee to the percolator is automatically shifted to a position to maintain same in a dry or clean condition.

An additional object of the invention is to provide a unique system of circuitry for controlling certain operating components of the machine.

A further object of the invention is to provide a device for automatically interrupting the flushing operation when a container or sump for the coffee grounds and rinse water attains a predetermined capacity.

Also, an object is to design and construct the heads so they will retain heat and provide one or more heating elements or applying heat to the heads.

A particularly important object of the invention is to provide an improved method or process for brewing a commodity, such as coffee.

Other objects and advantages of the invention reside in providing structure which offers many attributes with respect to manufacture and assembly, efficiency or operation, and durability.

In the drawings:

FIGURE 9 is a vertical section taken through the assembly shown in FIGURE 5 with the brewer heads locked in engagement with the tubular element;

FIGURE 10 is another vertical section taken through the assembly of FIGURE 5 showing the structural relationship of the cam means for operating the levers carrying the heads, while other cams are omitted;

FIGURE 11 is an enlarged vertical section illustrating the heads locked against the element, including sructural details of the components;

FIGURE 12 is a horizontal section taken through the tubular element showing in particular the mode of supporting the same;

FIGURE 13 is a top view showing the structural characteristics of two different filters respectively carried by the brewer heads, with one filter being broken away to illustrate the other;

FIGURE 14 is a partial transverse section taken through the filters;

FIGURE 15 is a plan view showing the structural characteristics and relationship of the various cam means associated with the levers and mode of mounting same;

FIGURE 16 is a perspective view of a switch used to control the flow of water to the percolator;

FIGURE 17 is a plan view of a cam means utilized to actuate the switch;

FIGURE 18 is a partial horizontal section showing the mode of attaching each of the levers of a control mechanism to a mounting plate or support;

Figure 1:
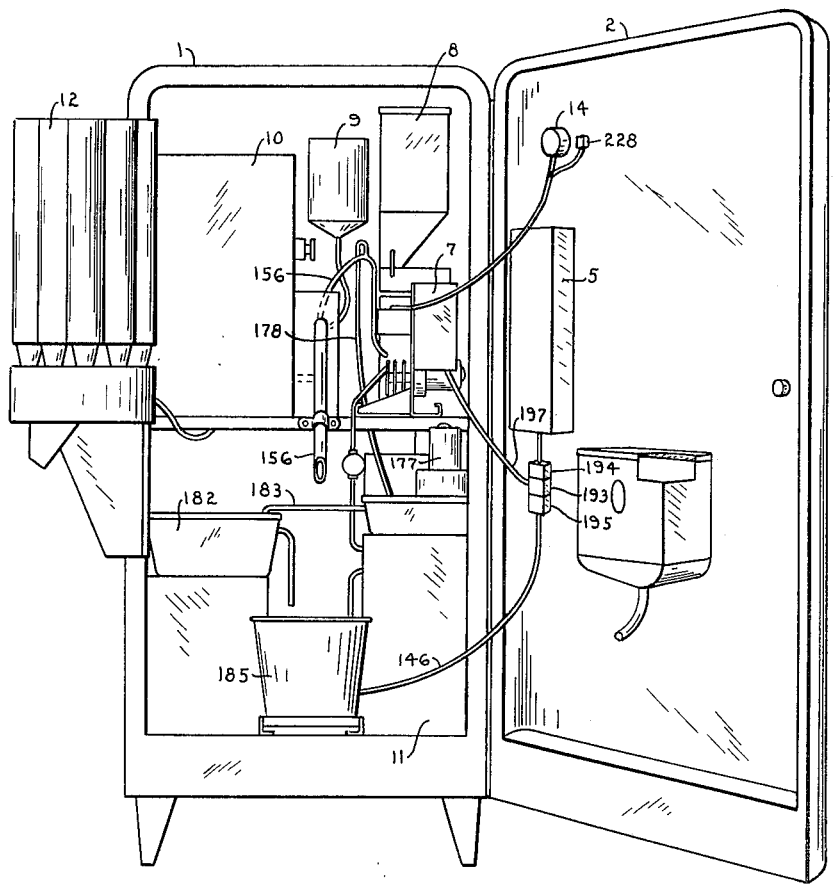
FIGURE 1 is a front elevational view of a cabinet having a door which is opened to show the general relationship of the components housed in the cabinet.
Figure 2:
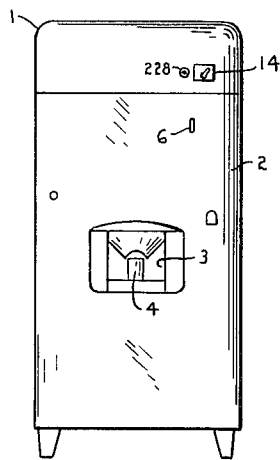
FIGURE 2 is a front elevational view of the cabinet shown in FIGURE 1 with the door closed.
Figure 3:
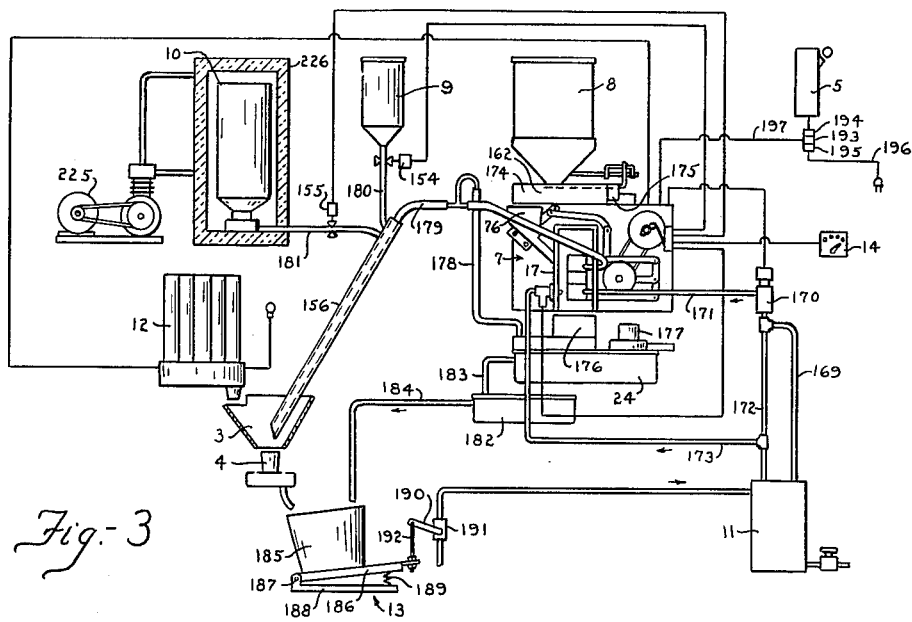
FIGURE 3 is a diagrammatic view showing the system.

Referring first to FIGURES 1, 2 and 3, there is exemplified a cabinet comprising a body 1 within which the machine is housed and a door 2 having an opening 3 through which a customer may obtain access to a cup 4 of brewed coffee. More particularly, there is shown, among other things, a coin receiver 5 which initially starts the machine when a coin is introduced thereto through a slot 6 in the door, a percolator or brewer assembly generally designated 7, a container 8 for coffee, a container 9 for syrup, a container 10 for cream, a supply of hot water 11, a magazine 12 for cups, a safety device 13, and a selector unit 14 for controlling the flow of sugar, syrup and/or cream to the brewer assembly.

The percolator assembly generally designated 7 and its operative relationship to the other components will now be described in greater detail. This assembly, FIGURES 5 through 10, preferably comprises a support or vertical plate 15 provided with brackets 16 which may be used to mount the assembly in the cabinet. A generally rectangular casing 17 is secured in a vertical position against the front side of the plate. This casing, as shown in FIGURE 9, includes a back wall 18 bearing against the plate, a pair of side walls 19 and 20, a top wall 21 and a transparent door or front wall 22 disposed in grooves provided in the side walls for slidable manipulation by a knob 23. The bottom of the casing is open so that coffee grounds or any residual matter and flush water left after the brewing process may fall into a container or pan 24 disposed below the casing as shown in FIGURE 3. The door permits one to readily discern the condition of the component in the casing and obtain access thereto. The walls of the casing proper are preferably of an insulated character and in order to maintain a relatively high temperature in the casing, preferably between 197 and 205 degrees, a pair of heating elements 25 are preferably mounted in brackets at the upper portions of the side walls. These elements are normally continuously energized through a closed circuit for operating the movable components of the machine.

Figure 5:
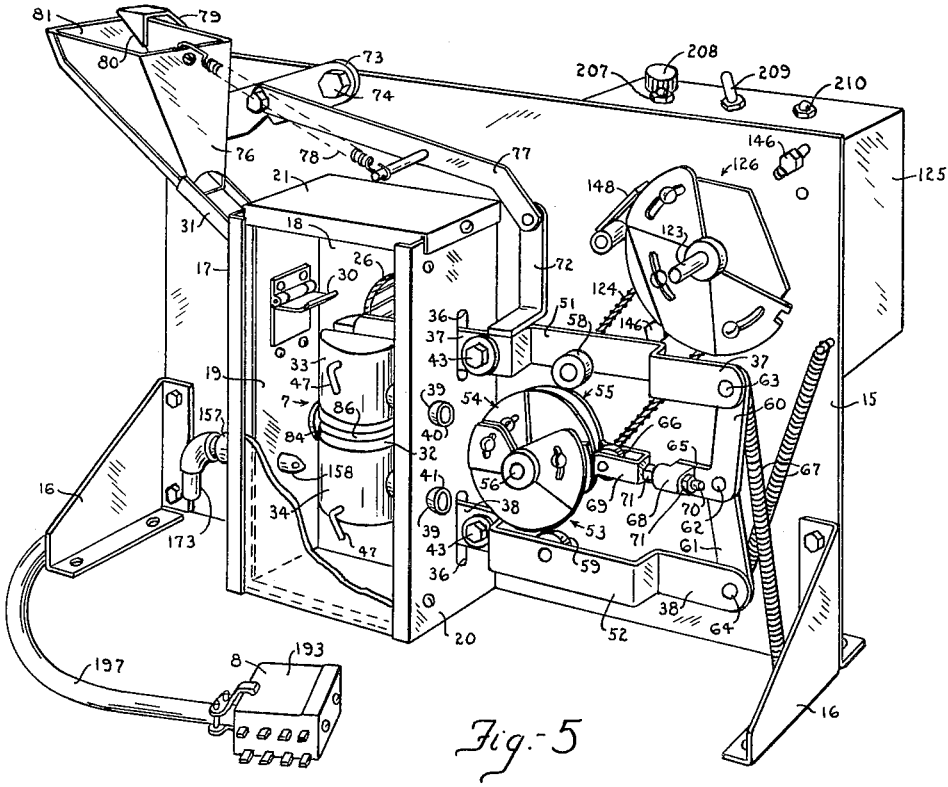
FIGURE 5 is a perspective view of the percolator structure or assembly.
Figure 6:
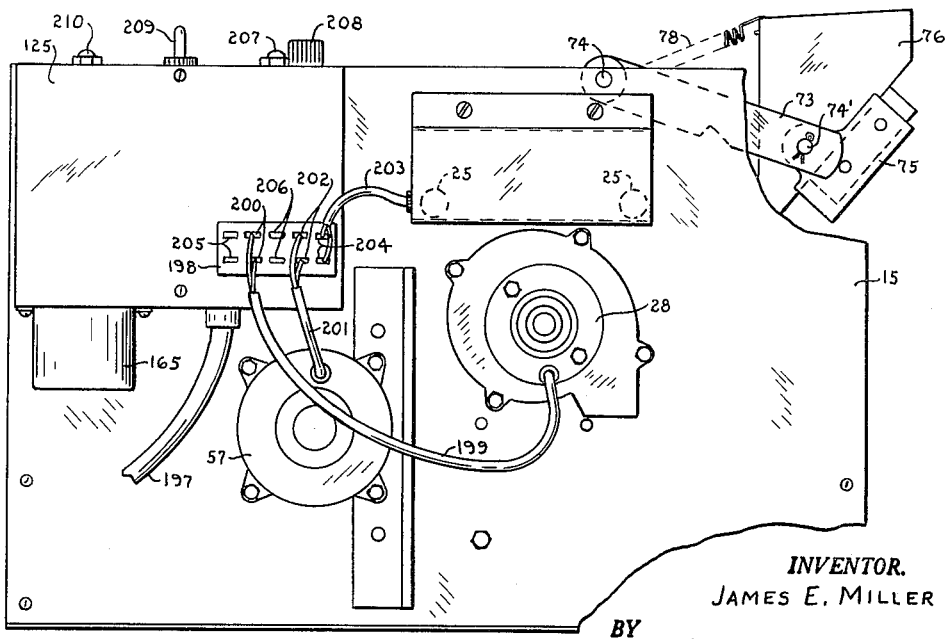
FIGURE 6 is a rear elevational view of the percolator shown in FIGURE 5 with portions broken away to illustrate structural details.
Figures 7, 8:
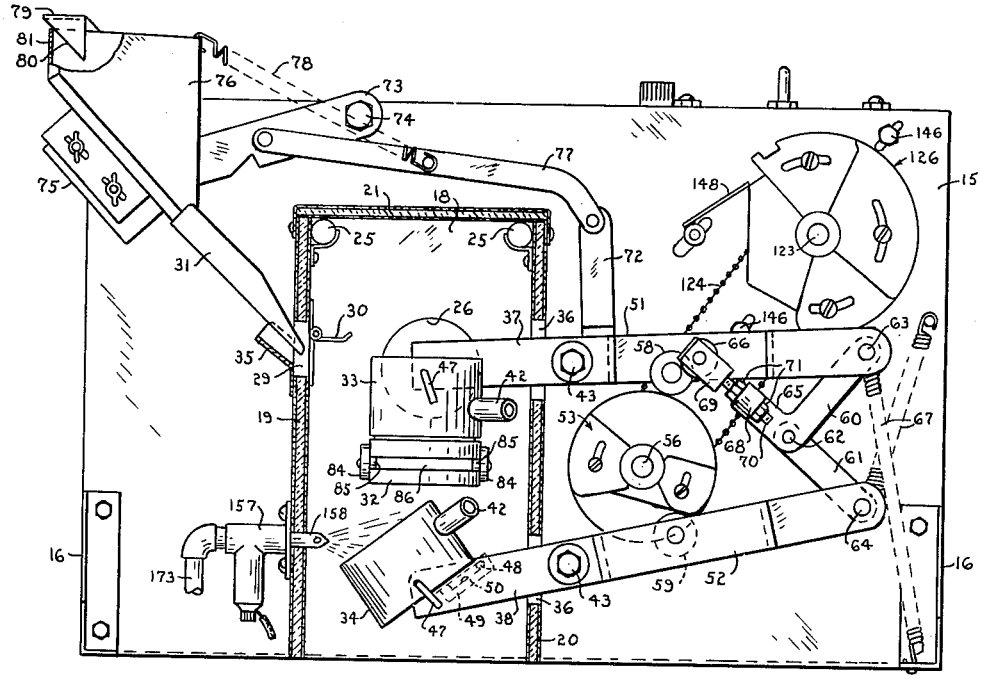
FIGURE 7 is a front elevational view of the structure depicted in FIGURE 5 showing the lower brewer head disengaged from the tubular element and the upper head engaged therewith.
FIGURE 8 is a view similar to FIGURE 7, showing the lower head and upper head respectively engaged and disengaged from the tubular element and entry of a coffee chute into the casing for introducing coffee to the element and lower head which form a receptacle for receiving the coffee.

The back wall of the casing is provided with an aperture 26 which is aligned with an aperture in the plate 15 for registry with an inlet opening in a fan structure 28, as shown in FIGURES 6 and 9, to exhaust vapor and/or odor from the casing during the process of rinsing the percolator following discharge of the brewed coffee. The side wall 19 as shown in FIGURE 7, of the casing is provided with an opening 29 which is preferably normally closed by a hinged gravity operated trap door 30 but is openable by a chute 31 which is extendable into the casing through the opening for discharging a predetermined quantity of ground coffee to a stationary open ended tubular element 32 and upper and lower brewer heads 33 and 34 constituting the percolator 7. The aforesaid side wall 19 is preferably provided with a guide 35 at the opening 29 which is shaped to assist in aligning the chute with the opening. The opposite side wall 20 of the casing is provided with a pair of spaced vertically aligned clearance slots 36. An upper lever 37 and a lower lever 38 respectively extend through the slots and respectively support the heads 33 and 34. The side wall 20, as depicted in FIGURES 5 and 11, is also provided with a pair of holes 39 through which conduits 40 and 41 respectively extend for connection with nipples 42 on the heads.

The levers 37 and 38 are preferably detachably connected to the plate 15 by screws 43, or equivalent means, and spacers 44 surround the screws to maintain the levers for pivotal movement in a plane parallel to the plane of the plate 15. The levers are substantially identical in design and construction and each includes an inner extremity provided with a hole 45, as depicted in FIGURE 11, and each of the brewer heads 33 and 34 is provided with a transverse slot 46. A removable pin 47 extends through aligned holes in each head including the hole in a lever to pivotally and readily detachably secure each head to its lever to facilitate assembly and disassembly of the heads for replacement and/or cleaning. The upper head 33 normally assumes a non-tilting position with respect to its lever and the same is true of the lower head, except when the lower head 34 is moved to a lower predetermined position by its lever, it is automatically tilted or pivoted to an angle, preferably between 60 and 70 degrees, by a fixed abutment 48 on the plate 15 disposed below the lower head for engagement by a fitting 49 adjustably carried by the underside of the head as shown in FIGURES 7, 8 and 9. The fitting 49 is provided with a slot which receives the abutment and has a surface 50 which engages the abutment to gradually tilt the head relative to its arm to the limit depicted in FIGURE 7 to permit release of the coffee grounds and rinse water as will be described more in detail subsequently.

The upper lever 37 is preferably offset rearwardly at 51 and the lower lever forwardly at 52 to provide ample space for three different rotatable cam means generally designated 53, 54 and 55 carried by a drive shaft 56 of a gear motor 57, the latter being mounted on the rear side of the supporting plate 15 for rotation, preferably at 5 r.p.m. A chain of reduction gearing (not shown) operatively connects the motor and drive shaft. The offsets 51 and 52 of the levers are respectively provided with rollers or cam followers 58 and 59 which are adapted for respective engagement with the cam means 55 and 53 in a manner whereby the latter actuate or pivot the levers to move the percolator heads 33 and 34 into engagement and disengagement with the tubular element 32.

A device is employed to lock the percolator heads to the tubular element 32 and this may be accomplished by utilizing a pair of links 60 and 61 which are pivotally connected at 62 and respectively pivotally connected to the outer ends of the upper and lower levers 37 and 38 by pivots 63 and 64. The link 60 is provided with an offset leg 65 which carries an adjustable device having a roller or cam follower 66 for engaging the cam means 54, the latter of which is interposed between the cam means 53 and 55. Biasing means, preferably comprising a pair of cross helical springs 67, have ends which are secured to the outer ends of the levers and to the plate 15 and one of the brackets 16 for normally urging the heads 33 and 34 away from the tubular element 32 and the rollers 58, 59 and 66 into respective engagement with their cam means 53, 55 and 54. The adjustable device carried by the leg 65 of the link 60 preferably includes a tubular part 68 fixed on the leg, a bifurcated member 69 having a threaded shaft 70 which extends through the tubular part 68, and a pair of nuts 71 on the shaft for lockably adjusting the member 69 to the link. The furcations of the member carry a pivot on which the roller 66 is mounted. It will be noted in FIGURE 5 that the furcations are preferably flared and serve to straddle the cam means 54 and guide the roller 66 into engagement therewith. This device affords a setup whereby the sealing pressure of the heads against the element 32 may be varied.

The upper lever 37 adjacent the pivot means 43 is provided with an upstanding member 72 and the plate 15 with a crank 73 which has one end pivoted at 74 to the plate and its other end pivoted to a bracket 75 which is slidably adjustable and removably secured to an angle piece fixed on the underside of a funnel 76 which carries the chute 31. As shown in FIGURES 6, 7, 8 and 9, wing bolts extend through the bracket 75 through slots in the angle piece and afford the adjustment just referred to. An elongate link 77 has its ends respectively pivotally connected to the upstanding member 72 and the crank 73 in such a manner that the funnel 76 and chute 31 will move as a unit about the pivot 74 in response to the movement of the upper lever, the purpose of which is to shift the chute through the opening 29 in the casing, lift the trap door 30, and feed coffee to the percolator 7 as evidenced in FIGURE 8. A helical spring 78 is preferably operatively connected to the link and the funnel 76 for normally urging the unit in a clockwise direction about the pivot 74 and a pivot 74' and assists in stabilizing the position of the unit and in locating the chute for entry into the casing 17. A bracket 79 is adjustably secured to the plate 15 adjacent to the funnel and provided with a cam surface 80 which is adapted to be engaged by a wall 81 of the funnel for gradually camming or tilting the unit, against the bias of the spring, to the position shown in FIGURE 7 to normally maintain the chute 31 in spaced relation to the casing 17, trap door 30 and guide 35 when the unit is pivoted upwardly through the agency of the lever 51 and cam 55. When the chute is so positioned the collection, or picking up any moisture or waste coffee from the guide 35 or walls of the opening 29, is substantially prevented.

Referring more specifically to the percolator structure 7 the tubular element 32 may also be described as a member provided with a chamber. The element may be mounted in any one of various ways but as best depicted in FIGURES 9, 11 and 12, it is preferably mounted in a U-shaped bracket secured in the casing 17. The bracket includes a base 82 provided with a cylindrical projection 83 and a pair of legs 84 provided with projections 85. The base 82 is preferably secured by means which extend through the back wall 18 of the casing and into the plate 15 by screws as depicted in FIGURE 12. The projections detachably nest in an external annular groove or recess 86 provided in the element to facilitate rotary adjustment of the element for locating purposes. The legs of the bracket are flexible and it will be noted that the projections 85 on the legs are so spaced with respect to the inner projection 83 that the element is vertically held in place and normally urged toward the plate 15.

Each of the percolator heads, as clearly shown in FIGURE 11, is provided with a recess or chamber 87 and these constitute continuations of the chamber in the tubular element or member 32. Each of the recesses 87 is counter-recessed at 88 and 89 and communicatively connect with a passage 90 which receives one of the nipples 42 above referred to. A filter unit 91 is detachably secured in the counter-recess 88 of the upper head by an O-ring or gasket 92, the latter of which is detachably secured in the counter-recess 89.

As illustrated in FIGURES 13 and 14, the filter unit 91 for the upper head 33 may comprise an annular ring 93 and preferably a pair of stainless steel screen discs 94 and 95 held in relation to one another by soldering their peripheral portions to the ring. The upper screen 94 is preferably of a larger mesh than the lower screen and each reenforces the other. A filter unit 96 is detachably secured in the recess 88 of the lower head 34 by a gasket 97, the latter of which is detachably held in the recess 89. The filter unit 96 differs from the filter unit 91 and preferably comprises an annular ring 93 and a single screen disc having a large mesh substantially corresponding to the mesh in screen 94. Obviously, screens of various meshes may be utilized as desired and renewed when required.

Attention is directed to the fact that the gaskets extend outwardly from the inner faces of the heads for engagement with the ends of the tubular element to provide a fluid tight brewing chamber. With this unique arrangement it will be apparent that the gaskets serve as seals, means for holding the filters in place, means for cushioning the heads as they are moved into effective cooperation with the tubular element and as annular side walls of recesses of which the filters constitute the bottom walls thereof.

The cam means 53, 54 and 55 and mode of mounting the same will now be described. These cam means, which may be referred to as first, second and third, as illustrated in FIGURES 5, 7, 8 and 15, are detachably secured to the drive shaft 56 of the motor for movement with the shaft in a clockwise direction as viewed in FIGURE 15. Each of these cam means is preferably of a segmental character for adjustment in order to influence proper movement of the levers and the heads 33 and 34 thereon. More particularly in this regard, each of the cam means includes a planar support 98 and a hub or collar 99 integral with the support. The drive shaft 56 extends through the hubs and the latter are provided with screws 100 for registry with a keyway 101 in the shaft to axially adjustably secure the cam means on the shaft for rotation therewith. The hubs lend stability to the supports and they may be utilized to axially space the cam means on the shaft.

The first or front cam means 53 serves to determine or control the periods the lower head 34 is engaged and disengaged from the tubular element, including the period that this head is flushed with water. As viewed in the lower part of FIGURE 15, the cam means 53 is adapted for engagement with the roller 59 on the lower lever 38 and includes a pair of planar sectors 102 and 103 which are respectively provided with arcuate slots 104 through which screws 105 extend and threadedly connect with the support 98 to firmly adjustably secure the sectors thereto. These sectors have inner arcuate edge portions 106 which engage the hub for stabilization and outer arcuate edge portions which coincide with a circumferential peripheral edge 107 of the support. The support has has a chordal edge 108 constituting the low side of the cam means and the sector 102 has a straight edge 109 disposed in an obtuse angular relationship to the edge 108.

More particularly, the sector 102 of the cam means 53 may be adjusted in a counter-lockwise direction relative to the support 98 to a position whereby the lower brewer head 34 can be held over for a longer period of engagement with the element 32 of the percolator until the lower head falls to the position shown in FIGURE 7. Adjustment of the sector 102 in a clockwise direction relative to the support will expedite release of the lower head from the element, through the agency of the spring 67 connected to the lower lever 38, and cause same to drop down for rinsing as soon as both heads are disengaged from the element through the linkage controlled by the cam means 54.

The sector 103 of the cam means 53 may also be adjusted in a clockwise direction to a position to cause the lower head 34 to be substantially engaged with the element 32 when coffee is dispensed into the percolator through the chute 3. Thus, by proper adjustment, it is possible to hold a small amount of water in the lower head and thereby moisten or saturate the coffee as it enters the percolator. The starting position of the roller 59 with reference to the cam means 53 is about three quarters of the way up the cam means and as the cam means rotates in a clockwise direction the roller rises to the high side of the cam means, due to the shape of the latter and the pull exerted by the spring 67 connected to the arm 38.

The second or center cam means 54, as alluded to above, serves to control the period that the heads are in locked relation to the tubular member during the brewing process. As viewed in FIGURE 15, this cam means is adapted to engage the roller 66 of the locking device and includes a pair of planar sectors 109 and 110 which are adjustably secured to the support in the same manner as the sectors 102 and 103 above referred to. The support 98 of this cam means is provided with a circumferential peripheral edge and chordal edges 111 and 112. The sectors are provided with arcuate edge portions for coincidence with the peripheral edge of the support and also with chordal edges 113 and 114 for respective adjustable disposition relative to the chordal edges 111 and 112 of the support. The hub 99 of this cam means constitutes its low side.

More specifically, the sectors 109 and 110 of the cam means 54 can be similarly adjusted to control the operation of the brewer heads 33 and 34. The sector 109, for example, can be moved in a clockwise direction to a position whereby it is possible to lock the brewer heads in operative relation to the element 32 in order to expedite the start of the brewing period or the sector may be moved in a counter-clockwise direction for adjustment to delay the locking operation.

The sector 110 may be moved counter-clockwise to a position which will cause the heads to remain locked for a longer period of time, thereby increasing the period of brewing or it can be moved clockwise to a position to reduce the brewing period within a range, for example, between two and one-half seconds to three and one-half seconds.

The third or rear cam means 55, as mentioned above, serves to control the periods that the upper head 33 is engaged and disengaged with the tubular element. As also shown in FIGURE 15, this cam means adapted for engagement with the roller 58 on the upper lever 37 and includes a pair of sectors 115 and 116. The support 98 of this cam means is provided with a chordal edge 117 constituting its low side and the sectors respectively with straight edges 118 and 119 for adjustment with respect to the chordal edge 117 constituting its low side. The sector 116 is also provided with a straight edge 120.

The sectors 115 and 116 of the cam means 55 may be adjusted more or less like the sectors on the cam means 53 and 54. For example, the sector 115 can be moved clockwise to a position to accelerate engagement of the upper head 33 with the element 32 or counter-clockwise to a position to delay its engagement with the element so that more coffee can be discharged into the percolator during one cycle of the brewing process.

The sector 116 can be moved in a counter-clockwise direction to a position whereby it is possible to regulate the brewing period, for example, approximately one second before the coffee chute 31 enters the casing 17 so it can be moved in a reverse or clockwise direction to a position to cause the chute to enter the casing substantially as soon as the cycle starts. The starting position of the roller 58 with reference to the cam means 55 is on the high side of the latter and on rotation of the cam means in a clockwise direction the roller immediately drops to the low side of the cam means, due to its shape and the pull exerted by the spring 67 connected to the upper arm 37.

It will be noted that all of the sectors utilized with all of the cam means preferably include rounded edge portions to facilitate their engagement with the rollers or cam followers.

As depicted in the upper part of FIGURE 15 and in FIGURE 17, a sprocket 121 is keyed to the shaft 56, a sprocket 122 to a driven shaft 123, with a chain 124 connecting the sprockets for driving the shaft 123. The rear extremity of the shaft 123 extends through the mounting plate 15 for controlling various mechanisms in a control box 125 attached to the rear side of the plate and its outer extremity carries a cam unit generally designated 126 and three cams 127, 128 and 129, as shown in FIGURES 19, 20 and 21.

The cam unit 126 which controls the supply of hot water to the percolator is clearly shown in FIGURES 5, 7, 8, 17, and 20. It is of a segmental character and comprises a planar support or cam plate 130 having a peripheral surface 131 and three sectors 132, 133 and 134 adjustably secured to the support. The sector 133 is larger than the other sectors and is adjustably detachably secured against the support by a screw 135 and the sectors 132 and 134 are detachably secured to the support by screws 136. The larger sector 133 is provided with circumferential edges which coincide with the circumferential edge 131 of the support and the support is provided with an edge 137 and three chordal edges 138, 139 and 140. The sector 132 includes a straight or radial edge 141 and an arcuate edge 142 provided with a notch 143 and the sector 134 has an arcuate edge and straight or radial edges 144 and 145. The sectors have inner arcuate edges which engage a hub on the support to assist in stabilizing their positions.

Figure 19:
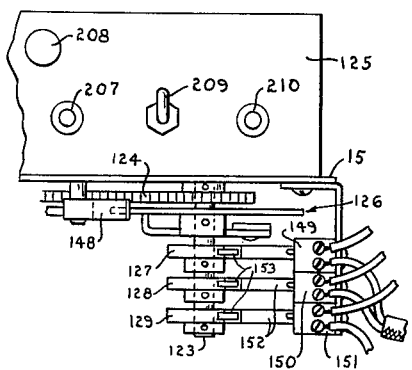
FIGURE 19 is a partial plan view of cams carried by a driven shaft of the machine, which cams are not mounted on this shaft in FIGURES 5, 7, 8 and 10.
Figure 20:
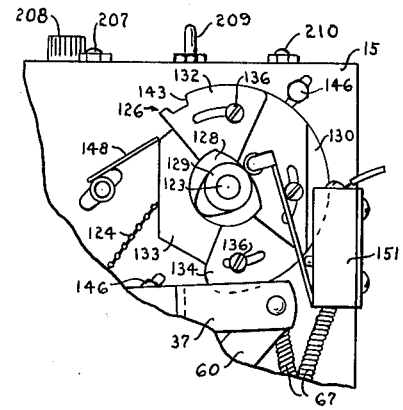
FIGURE 20 is a partial elevational view of the structure shown in FIGURE 19.
Figure 22:
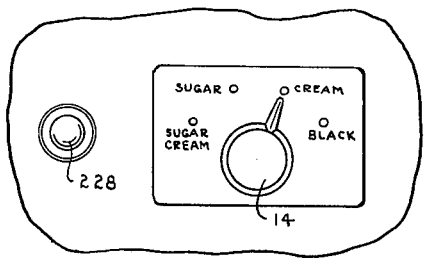
FIGURE 22 is a front elevational view of a selector structure for selecting the product desired.
Figure 21:
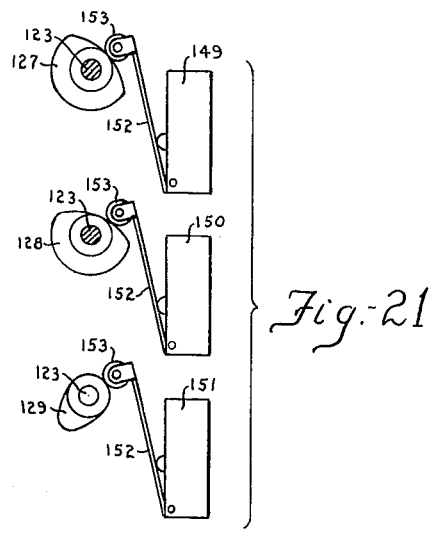
FIGURE 21 is an organizational view illustrating the cams shown in FIGURES 19 and 20 for controlling the flow of cream and/or sugar to a delivery tube and rinsing of the percolator.

The driven shaft 123, as shown in FIGURES 19, 20 and 21, is adjustably mounted on the plate 15 by providing slots in the plate for the shaft and means 146 which extend through the plate for moving the shaft relative to the drive shaft 56 for controlling the tension of the chain 124. The cam unit 126 carried by the driven shaft 123 is adapted to actuate a switch 147 through an actuator 148 which rides against the unit. The switch 147 controls the flow of hot water to the percolator.

The sectors of the cam unit 126 can be adjusted as desired to vary the brewing or percolating period, the period of rinsing the percolator, and the flow of water through the percolator.

More specifically in this regard, the sector 132 can be moved in a counter-clockwise direction relative to the support or cam plate 130 to a position whereby it is possible to run the water after the lower head 34 has dropped, in order to allow the water to flow through the lower head via a pipe 171, as shown in FIGURE 3, for a first rinsing of this head. The notch 143 in this sector may receive the actuator 148 of the switch 147 to turn the water off after the lower head 34 reaches its lowermost position, whereupon the secondary rinse switch 151 is operated by the cam 129 to actuate a valve 157 to cause water to spray and rinse the open lower head 34 a second time for a predetermined period, determined by the cam 129, after which the water is again caused to flow through the lower head via the pipe 171 for a final or third rinsing. Reestablishment of the flow of water through the pipe 171 for the third rinsing is achieved by the actuator 148 riding out of the notch 143 onto the periphery of the sector 132 to actuate the switch 147 to open a valve 170. The rinse switch 151 is actuated by its cam 129 to complete a circuit from the hot side of the brewer motor 57 to the rinse valve 157. The sector 132 may be moved clockwise to a position to stop the flow of water to the lower head before it becomes disengaged from the element 32 through the agency of the cam means 54, thereby conserving or reducing the amount of rinse water required.

The segment 134 may be moved in a clockwise direction to a position where it is possible to expedite the initial flow of water into the lower head or may be moved counter-clockwise to a position to delay the flow of water into the lower head and thereby shorten the flow time or reduce the amount of water used.

The sector 133 may be moved counter-clockwise to a position to provide a gap or recess between a radial edge 130' of the sector 133 and the edge 140 of the support 130 for reception of the actuator 148 so that it is possible to shut off the flow of water for brief intervals of time, for example, one to three seconds, to retain the water already in the percolator for such period to promote the brewing process, after which water will again flow into the percolator. When the sector 133 is in a normal position shown in FIGURE 17, water will flow through the percolator for the period for which the machine is adjusted. The sector 133 may also be moved clockwise relative to the plate 130 to a position whereby the water can be shut off, for example, from one to three seconds, to allow the coffee to brew in the percolator in substantially the same manner as when the sector is moved counter-clockwise. More specifically in this regard, the sector 133 can be moved clockwise so as to provide a gap or recess between a radial edge 133' thereof and the edge 140 of the plate 130 to allow the actuator 148 to fall therein to temporarily shut off the water for the period aforesaid.

Attention is directed to the fact that although sectors 132, 133 and 134 can be separately or jointly adjusted clockwise or counter-clockwise to control the periods of percolation and rinsing, the sector 133 is preferably moved counter-clockwise to a position to stop the flow of water through the percolator and simultaneously retain the brewing coffee in the percolator for a predetermined period, preferably from one to three seconds. The purpose of adjusting sector 133 in this manner, in preference to sector 134, is to prevent water from flowing out of the upper head 33 in order to permit the gases given off in the brewing process to remain in the percolator until additional water enters the percolator for continuing the process. This particular adjustment is important as it affords a setup whereby to obtain a maximum yield from the coffee. The organization is preferably such that the actuator 148, while successively engaging the edges 137, 138 and 139 of plate 130 and edge 144 of the sector 134, serves to prevent the flow of water to the percolator. While the actuator 148 is successively engaging the peripheral edges of the sectors 134, 131 and 133 and the peripheries 141 and 142 of plate 130 and sector 132 it causes water to continually flow to the percolator, but when the actuator drops into the notch 143 the flow is stopped. When the actuator engages the periphery 142 of the sector 132 the water will again flow to the percolator for a brief period for rinsing same. The actuator then repeats its cycle of engagement with the aforesaid edges, surfaces or peripheries.

As shown in FIGURES 19 and 21, cams 127, 128 and 129 on the driven shaft 123 respectively serve to actuate switches 149, 150 and 151. Each of the aforesaid switches is provided with an actuator 152 having a roller 153 thereon for respective engagement with its cam. The switches 149 and 150 are respectively operated by the cams 127 and 128 to actuate solenoid actuated valves 154 and 155 to control the flow of sugar and cream from the containers 9 and 10 into a tube 156 for delivery to a cup 4 and the switch 151 operable by the cam 129 serves to actuate the solenoid actuated valve 157 to control the flow of water to a nozzle 158 in the casing 17, which flushes or rinses the lower head 34 of the percolator (see FIGURES 3, 5 and 7).

Referring to the upper part of FIGURE 17 there is disclosed a cam 159 on the shaft 123 which engages an actuator 160 of a switch 161 disposed within the confines of the box 125 shown in FIGURES 5 and 6. This cam controls a switch 161 which functions to turn the motor 57 "on" and "off". The switch 147 which controls the supply of water to the percolator, as above referred to, is also located in the box 125 and two additional switches which substantially correspond to the switch 147 are also disposed in the box for actuation by cams carried by the shaft 123. A switch 162 is employed to control the operation of a solenoid 162' which actuates a slide valve or plate 175 to measure and dispense the coffee from the hopper to the funnel as alluded to above. Another switch 163 of a conventional delayed air type controls the operation of the exhaust fan 28 to exhaust steam or vapor or odors from the casing 17 when one or both of the heads 33 and 34 are disengaged from the element 32. A small box 164 is supported on the control box 125 and contains a relay mechanism 165 provided with pairs of contacts 166, 167 and 168.

As shown in FIGURE 3, a pipe 169 communicatively connects the hot water tank 11 with a solenoid valve 170 which in turn is connected to the lower head 34 of the percolator through a pipe 171. A return pipe 172 is connected to the line 169 and the tank and a line 173 is connected with the line 169 and to the solenoid actuated valve 157 controlling the nozzle 158 which is located in close proximity to the lower head 34 as evidenced FIGURES 7 and 8.

Referring further to FIGURE 3, the coffee hopper 8 is provided with a combined measuring, agitating and dispensing means which includes a housing 174 within which the slide 175 is disposed. The slide is provided with an opening (not shown) which is adapted to register with an outlet in the bottom of the hopper to permit the coffee to fall into the opening which measures the quantity. When the slide is moved to the left in FIGURE 3 coffee in the opening falls into the coffee funnel 76, after which the slide is returned by a spring (not shown). The slide valve is preferably provided with upturned fingers (not shown) which extend into the coffee in the container to agitate the coffee when the slide is reciprocated.

There is also illustrated in FIGURE 3 the pan 24, above referred to, which constitutes a sump for the discharged coffee grounds and rinse water. This pan is provided with a cover having a tubular formation 176 which extends upwardly in close axial relation with the opening in the bottom of the percolator. The cover is also provided with an exhaust fan 177 which vacuums off the odors and steam discharged from the percolator into the pan. A pipe 178 is communicatively connected to the pan and with a pipe 179 connecting the tube 156 and the percolator to provide for venting to permit flow of the brewed coffee, cream and/or sugar into the tube 156. This venting pipe also serves to allow any fluid backing up in the tube 156, due to stoppage, to flow into the sump or pan 24. It will be noted that the solenoid actuated valves 154 and 155 are respectively interposed in pipes or lines 180 and 181 which connect the sugar container 9 and cream container 10 with the tube 156. If desired, the pan 24 can be made larger or smaller depending on the capacity desired or an additional pan 182 may be employed with a conduit 183 connecting the pans. A pipe or line 184 extends from the pan 182 to a container or bucket 185, the latter of which is preferably mounted on a biased pivotal supported 186 constituting a component of the safety device 13, above referred to. The support is mounted for movement about a horizontal pivot 187 connecting the support with a base 188, with resilient means 189, in the form of a helical spring, interposed between the free ends of the base and support. The free end of the support is operatively connected to a lever 190 of a main water supply valve 191 by a connecting element 192 in such a manner that when the container becomes filled to approximately an 80% capacity the valve will automatically close to prevent the water from flowing into the solenoid actuated valves 157 and 170. The resilient means 189 serves to normally maintain the support in an inclined position and the valve 191 normally open.

As depicted in FIGURES 1, 3, 4 and 5, there is shown a plug 193, commonly referred to as a Jones plug, which is detachably connected to an electrical receptacle 194 which is connected to the coin receiver mechanism 5 and to an electrical receptacle 195 adapted for connection with a main line or source 196. The plug 193 is connected to the structure shown in FIGURE 5 by a conduit 197. As shown in FIGURE 6, a junction block 198 is preferably mounted on the rear side of the box 125 and conductors within a conduit 199 operatively connected the exhaust fan 28 adjacent the casing 17 to terminals 200 on the block. Conductors within a conduit 201 operatively connect the motor 57 to a pair of terminals 202 on the block. Also, a pair of conductors within a conduit 203 operatively connected the heaters 25 in the casing 17 with a pair of terminals 204 on the block. A pair of conduits with conductors therein (not shown) operatively connect a pair of terminals 205 on the block with the solenoid 162' which controls the flow of coffee to the funnel 76 and another pair of conduits having conductors therein (not shown) operatively connect the value 170 controlling the flow of hot water through the pipe 171 to the percolator with a pair of terminals 206 on the block.

Figure 4:
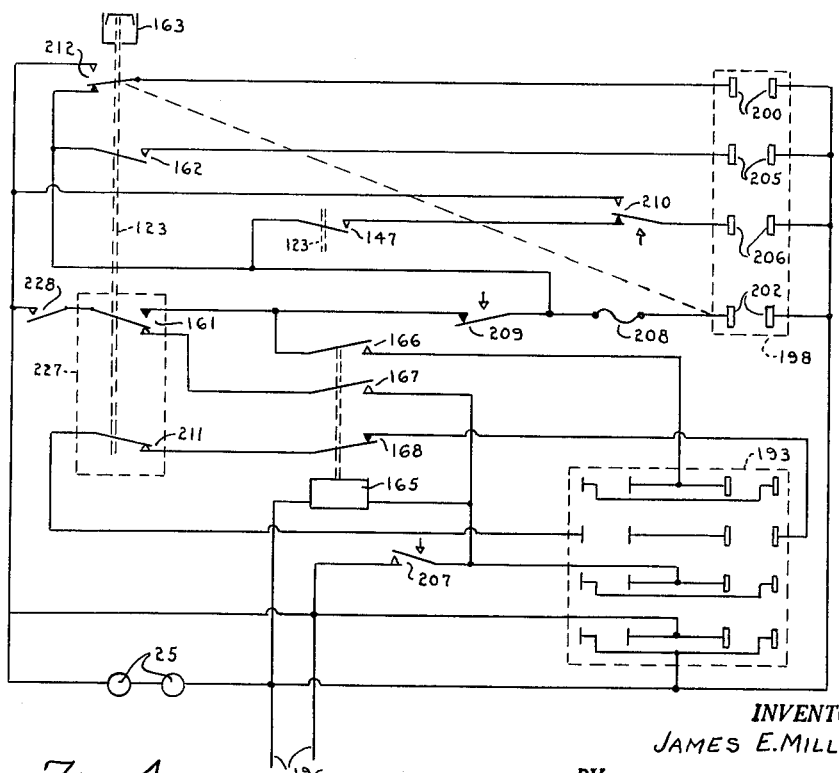
FIGURE 4 is a diagram of the circuitry.

A manually operable switch 207 is mounted on the box 125 as depicted in FIGURES 4 and 5 to place the machine in a condition for vending and a fuse device 208 is operatively connected with the circuitry for safety purposes. A manual operable toggle switch 209 and a push button switch 210 are also mounted on the box. The switch 209 serves to start and stop the motor 57 and the switch 210 is utilized by a serviceman to initiate flushing of the percolator by actuating the valve 170. A coin return switch 211 and a fan switch 212 are also included in the circuitry.

The complete machine is used to automatically brew coffee one cup at a time.

Electrical power for the machine is supplied from a 60 cycle 115 volt 30 ampere circuit. Power is applied to the vending circuits by plugging the plug connector 193 into a main supply circuit 196. When the connector is plugged into the source of supply, the exhaust 177 and a compressor 225 for refrigerating an insulated cabinet 226 for the cream container are placed in operation.

When a coffee selection is made and the proper coinage inserted a coin switch (not shown) in the coin receiver 5 is actuated and a voltage is momentarily applied through associated contacts (not shown) in the selector switch 14 to the solenoid of the brewer mechanism start relay 165 located in the control box 125 and to a solenoid which serves to drop a cup 4 into the opening 3 of the machine. The relay 165 is energized to operate its three pairs of contacts, 166, 167 and 168. The automatic start contacts 166 of the relay 165 close and this completes a motor circuit from the contacts 167 with the external voltage source 196 through a normally closed manual stop switch 209 to the motor fuse device 208, to the motor 57 as shown in FIGURE 6, and to the contacts of the water switch 147 and coffee switch 162 through the fan switch 212 to the fan 28.

The contacts 167 close and complete the relay circuit through alternate contacts of the double throw double pole motor switch 161, holding the relay in the energized position after the momentary starting voltage applied to contacts 166 has been removed. The contacts 168 of the relay 165 open and break an external control circuit which regulates a mechanism in the coin receiver to receive or reject coins.

The various cams on the shaft 123 control switches for starting and stopping the electrically operated devices. As the shaft turns through one revolution (per cycle of operation) it first opens the coin return switch 211 and breaks an external control circuit. Mechanically and electrically coupled to follow the coin return switch action and within a switch case 227 is the motor switch 161, above referred to. In operation, the motor switch 161 breaks the relay holding circuit between the hot line through the relay hold contacts 167 and the relay 165. This de-energizes the relay 165 thereby opening the contacts 166 and the contacts 167 and closing the coin return contacts 168.

The coffee switch 162 is next in time sequence to operate. A cam (not shown) on shaft 123 is adjusted to actuate the switch 162 at the moment the coffee chute 31 enters the brew chamber or casing 17. Voltage is thus applied to the solenoid 162' for actuating the slide valve 175 and through its action drops a portion of ground coffee into the coffee chute and thence into the brew chamber. The aforesaid cam then releases the switch 162 to break the circuit between the hot line and the solenoid 162', thereby allowing the plate or valve 175 to automatically return for the next cycle through the agency of the spring above referred to. As the coffee brewer heads close, the cam unit 126 actuates the switch 147, completing a circuit from the hot line through the alternate contacts of the manual flush switch 210 to the valve 170. The brewing part of the cycle now starts as the solenoid of the valve 170 opens this valve and allows hot water to flow. Coffee is produced as the hot water flows through the screen in the lower head 34, up through the ground coffee in the brew chamber and out through the screens in the upper brew head 33 and down the tube 156. It is to be understood that although the coffee may be continuously brewed while the water is flowing through the percolator, the sector 133 of the cam unit 126 may be adjusted clockwise or counter-clockwise to interrupt the flow of water to the percolator for a period of one-half second to three seconds to vary the brewing period in a manner whereby to regulate the strength of coffee desired. Also, as exemplified in FIGURE 4 of the drawing, a switch 228 may be interposed in the circuitry to interrupt the flow of current to the motor 57. This switch may be placed adjacent the selector 14 for convenient operation and may be manually held in an inoperative position at an appropriate time for any period desired by a customer to control the brewing period and thereby vary the strength of the coffee. These alternative arrangements also serve to obtain a greater yield from the ground coffee. After the coffee is brewed it flows into the tube 156 and into a cup. Simultaneously with the brewing of the coffee, cream and/or sugar may be delivered to the cup through the tube 156. The selector 14 is preferably set or adjusted prior to the insertion of a coin to serve black coffee, coffee with cream, coffee with sugar, or coffee with cream and sugar. To provide these liquid ingredients, the containers and valves associated therewith are located within the vending machine. If a cream or sugar selection is made, a circuit from the hot line of the brewer motor 57 through the selector switch 14 on the front of the cabinet door, to the cam controlled switches 150 and 149 provides for controlling the operation of the solenoid valves 155 and 154 located beneath the respective containers 10 and 9. The switches 149 and 150 for controlling the release of cream and sugar are located adjacent the percolator as shown in FIGURE 19. These switches are respectively operated by the cams 128 and 127 on the shaft 123 as previously mentioned. The lower brew head 34 then opens as in FIGURE 7 and after a short flush of water through pipe 171 the cam operated water switch 147 breaks the circuit to the solenoid associated with the valve 170 to close the valve. The switch 151, next in the time sequence, is actuated by its cam 129 which completes a circuit from the hot side of the brewer motor 57 to the secondary rinse valve 157 as described above. When the valve 157 opens water passes therethrough to the secondary rinse spray nozzle 158 located in the left side of the casing, which nozzle is aimed to spray the lower head when opened. The air exhaust fan 28 operated from the beginning of the cycle through the alternate contacts (not shown) of its switch 212 now has its air switch 163 pushed in momentarily by a cam (not shown) on the shaft 123, which switch is later released by the cam for subsequent operation. More particularly, when the air switch 163 which offers delayed action, is pushed in by the cam a circuit is immediately completed to the main hot line and the fan to operate the latter for approximately two minutes in order to exhaust the steam, odor and gases following completion of the brewing period.

As the brewer motor 57 completes its cycle of one revolution, the coin switch 211 closes to complete a circuit to a coin blocking solenoid (not shown) in the coin receiver 5 so that the receiver will selectively receive coins for starting successive cycles of operation. After the coin switch closes, the motor switch 161 functions to first open the circuit from the hot line to the motor 57 to stop the motor and also closes a circuit from the hot line to the hold contacts 167 of the starting relay 165, whereby to place the circuitry in condition for the start of the next cycle of operation.

Having thus described my invention, it is obvious that various modifications may be made in the same without departing from the spirit of the invention, and, therefore, I do not wish to be understood as limiting myself to the exact form, construction, arrangement, and combination of parts herein shown and described.

I claim:

1. In combination: a stationary open ended tubular element constituting a component of a percolator, a pair of elongate bars pivotally mounted intermediate their length, a pair of hollow heads respectively carried by the bars at one end thereof and constituting components of the percolator, cam followers respectively carried by the bars at a location between their pivotal mountings and opposite ends, cam means engageable with the followers for actuating the bars to cause the heads to engage the ends of said element, means for automatically disengaging the heads from said element, and spring means operatively connected to the opposite ends of said bars for biasing the cam followers into engagement with the cam means.

2. In combination: a support, an open ended tubular element mounted on the support and constituting a stationary central component of a percolator, a pair of bars respectively pivotly mounted intermediate their ends, a pair of hollow metal heads respectively carried by fore ends of the bars and constituting movable components of the percolator, means including a pair of separate rotatable cams engaging said bars for causing the heads to engage and disengage the ends of said element, a third rotatable cam, and linkage means operatively connecting opposite ends of said bars and engageable with said third cam for locking and controlling the time said said heads are engaged with said element.

3. In combination: a support, an open ended tubular element stationarily mounted on the support, a pair of pivotal levers, a pair of hollow heads respectively carried by the levers, means for biasing the levers to urge the heads away from the element, cam followers respectively carried by the levers, a pair of axially spaced cam means respectively engageable with the followers for actuating the levers to cause the heads to engage the ends of said element, and means for tilting one of said heads relative to its lever when moved a predetermined distance away from said element.

4. In combination: a support, an open ended tubular element stationarily mounted on the support and constituting a component of a percolator, a pair of bars respectively pivoted intermediate their ends to the support, a pair of hollow heads respectively detachably carried by fore ends of bars and constituting components of the percolator, cam followers respectively carried by the bars, cam means interposed between the bars and engageable with the followers for actuating the bars to cause the heads to engage the ends of said element, and means connected to the opposite ends of said bars and separate from said cam means for locking the heads in relation to the element.

5. In combination: a support, an open ended tubular element mounted on the support and constituting a component of a percolator, a pair of hollow heads constituting components of the percolator engageable with said element, a pair of bars respectively detachably supporting said heads, at least one of said heads being movable relative to its bar, means for introducing a product to be brewed to said element, and means whereby a liquid may be caused to successively flow transversely into and through one of the heads and laterally out the other head via said element when said heads are engaged with said element, and means for effecting pivotal movement of said movable head relative to its bar when the head is moved a predetermined distance away from said element.

6. In combination: a support, an open ended tubular element resiliently connected to the support in a vertical position and constituting a component of a percolator, a pair of levers pivoted for vertical movement and provided with hollow heads constituting components of the percolator, means carried by the levers, movable means cooperable with the said means for actuating the levers to cause the heads to engage and disengage the ends of said element for different periods, means for automatically introducing a product to be brewed to the element when one of the heads is disengaged from the element, means for automatically introducing a liquid to one head for flow to and out through the other head via the element when the heads engage the element, means for tilting one of the heads relative to its lever when this head is disengaged from the element, and means for rinsing said one head when tilted.

7. In combination: a support, a casing carried by the support and provided with an opening, an open ended stationary member vertically disposed in the casing, a pair of elongate levers pivoted on the support and respectively provided with an upper hollow head and a lower hollow head located in the casing, rollers carried by the levers, a chute movably mounted on the support for conducting a commodity to the member, means operatively connecting the chute with one of the levers, and means interposed between the levers for engaging the rollers to actuate the levers to cause the chute to enter the opening and permit the discharge of a commodity into the member after the lower head engages the lower end of the member and then effect a retraction of the chute as the upper head is brought into effective engagement with the upper end of the member.

8. The combination defined in claim 7, including means for biasing the levers to normally force the heads away from the member, links operatively connected with one another and the levers, and means for actuating the links for locking the heads in relation to the member for a predetermined period.

9. In combination: a support, a casing carried by the support and provided with an opening, an open ended member vertically disposed in the casing, a pair of elongate levers pivoted on the support and respectively provided with an upper hollow head and a lower hollow head located in the casing, a chute movably mounted on the support for conducting a commodity to the member, means operatively connecting the chute with one of the levers, means interposed between the levers for actuating them to cause the chute to enter the opening and permit the discharge of a commodity into the member after the lower head engages the lower end of the member and then effect a retraction of the chute as the upper head is brought into effective engagement with the upper end of the member, and means for heating the interior of the casing.

10. In combination: a support, a casing carried by the support and provided with an opening, an open ended stationary member vertically disposed in the casing and provided with a chamber, a pair of elongated levers pivoted on the support and respectively provided with an upper hollow head and a lower hollow head located in the casing, each of said heads being provided with a recess, a gasket secured in each of the recesses for sealing engagement with the head, rollers carried by the levers, a chute movably mounted on the support for conducting a commodity to the chamber, means operatively connecting the chute with one of the levers, a plurality of means interposed between the levers for engaging the rollers to actuate the levers to cause the chute to enter the opening and permit the discharge of a commodity into the member after the lower head engages the lower end of the member to communicatively connect the interior of this head with the chamber and then effect a retraction of the chute as the upper head is brought into effective engagement with the upper end of the member to communicatively connect its interior with the chamber, and means for automatically disengaging the heads from the member after the heads have remained engaged with the member for a predetermined period determined by at least one of said plurality of interposed means.

11. In combination: a support, a member provided with a chamber, a pair of pivotally mounted elongate levers respectively provided with an upper hollow head and a lower hollow head, means for moving one lever to cause the lower head to engage the member, a movable chute for directing a ground product into the chamber when the lower head is engaged with the member, means for moving the other lever to cause the upper head to engage the member, said lower head and upper head being respectively provided with an inlet and an outlet, means whereby a liquid can be forced into the inlet for passage through the lower head, chamber, upper head and out through the outlet, means for regulating the flow of liquid through the heads and chamber, means separate from said lever moving means for maintaining the heads engaged with the member for a predetermined period of time, means for releasing the lower head from the member, means for releasing the upper head from the member, means for tilting the lower head relative to its lever after it is released from the member, and means for rinsing the lower head when it is tilted.

12. In combination: a support, a member provided with a chamber, a pair of pivotally mounted elongate bars respectively provided with an upper hollow head and a lower hollow head, means for moving one bar to cause the lower head to engage the member, a movable chute and means for moving the same so a ground product may be directed into the chamber when the lower head is engaged with the member, means for moving the other bar to cause the upper head to engage the member, said lower head and upper head being respectively provided with an inlet and outlet, means whereby a liquid can be forced into the inlet for passage through the lower head, chamber, upper head and out through the outlet, means for regulating the flow of liquid through the heads and chamber, means operable independently of said bar moving means for maintaining the heads engaged with the member for a predetermined period of time, means for releasing the lower head from the member, means for releasing the upper head from the member, and means for tilting the lower head relative to its bar after it is released from the member.

13. The combination defined in claim 12, including means operatively correcting and synchronizing all of the aforesaid means whereby to render the combination automatic in operation.

References Cited by the Examiner

UNITED STATES PATENTS

| | | | |
|---|---|---|---|
| 2,718,843 | 9/1955 | Jones | 99—289 |
| 2,895,402 | 7/1959 | Totten | 99—289 |
| 2,907,265 | 10/1959 | SeBastian | 99—289 X |
| 2,931,288 | 4/1960 | Totten | 99—289 |
| 3,007,391 | 11/1961 | Reynolds | 99—289 |
| 3,011,426 | 12/1961 | Mueller | 99—289 X |
| 3,045,870 | 7/1962 | Danziger. | |
| 3,070,000 | 12/1962 | Johnson | 99—289 |
| 3,085,496 | 4/1963 | Reynolds | 99—289 |

ROBERT E. PULFREY, *Primary Examiner.*

J. D. BEIN, *Examiner.*